United States Patent [19]

Melby et al.

[11] Patent Number: 5,620,280
[45] Date of Patent: *Apr. 15, 1997

[54] CONCRETE ARMOR UNIT TO PROTECT COASTAL AND HYDRAULIC STRUCTURES AND SHORELINES

[75] Inventors: Jeffrey A. Melby; George F. Turk, both of Vicksburg, Miss.

[73] Assignee: U.S. Army Corps of Engineers as Represented by the Secretary of the Army, Washington, D.C.

[ * ] Notice: The term of this patent shall not extend beyond the expiration date of Pat. No. 5,441,362.

[21] Appl. No.: 290,721

[22] PCT Filed: Aug. 17, 1994

[86] PCT No.: PCT/US94/09263

§ 371 Date: Nov. 15, 1995

§ 102(e) Date: Nov. 15, 1995

[87] PCT Pub. No.: WO95/09279

PCT Pub. Date: Apr. 6, 1995

Related U.S. Application Data

[63] Continuation-in-part of Ser. No. 128,426, Sep. 30, 1993, Pat. No. 5,441,362.

[51] Int. Cl.⁶ .................................................... E02B 3/04
[52] U.S. Cl. ............................................... 405/29; 405/16
[58] Field of Search ................... 405/15–34; 52/608, 52/609

[56] References Cited

U.S. PATENT DOCUMENTS

| | | |
|---|---|---|
| D. 277,609 | 2/1985 | Deimen . |
| D. 300,863 | 4/1989 | McNeely . |
| 2,909,037 | 10/1959 | Palmer . |
| 3,176,468 | 4/1965 | Nagai . |
| 3,456,446 | 7/1969 | Kusatake . |
| 3,614,866 | 10/1971 | Kaneko et al. ......................... 405/29 |
| 3,759,043 | 9/1973 | Tokunaga . |
| 4,347,017 | 8/1982 | Chevallier . |
| 4,594,023 | 6/1986 | O'Neill . |
| 4,594,206 | 6/1986 | Grafton . |
| 4,633,639 | 1/1987 | Deimen . |
| 5,122,015 | 6/1992 | Shen . |
| 5,190,403 | 3/1993 | Atkinson . |
| 5,441,362 | 8/1995 | Melby et al. ......................... 405/29 X |

FOREIGN PATENT DOCUMENTS 2647135  11/1990  France ......................... 405/29

OTHER PUBLICATIONS

Permanent International Association of Navigation Congresses Bulletin, A.I.P.C.N.–P.I.A.N.C 1994—No. 82, pp. 3–17.

Breakwater Choices, George Vincent, Civil Engineering, pp. 64–66, Jul. 1989.

Stability of Accropode(R) and Comparison with dolosse, A.H. Holtzhausen et al., Coastal Engineering, 15 (1991) 59–86.

*Primary Examiner*—Dennis L. Taylor
*Attorney, Agent, or Firm*—Luther A. Marsh

[57] ABSTRACT

An armor unit for protecting coastal, river, lake, and reservoir banks, shorelines, and other structures from the damaging hydrodynamic forces of waves and water currents. The armor unit has a central elongate member having a longitudinal axis and first and second outer elongate members connected with the central elongate member on opposite sides thereof. The first and second outer elongate members have parallel longitudinal axes extending normal to the longitudinal axis of the central elongate member. The elongate members may each have an octagonal cross section decreasing from an intermediate portion toward the opposite ends. When a plurality of units are interlocked to define a protective array, a high degree of wedging is afforded between the octagonal members.

41 Claims, 5 Drawing Sheets

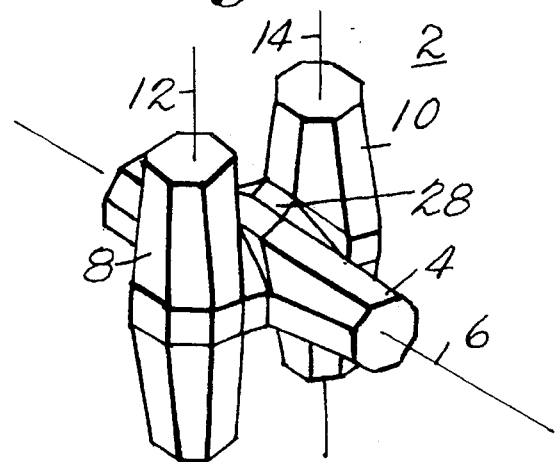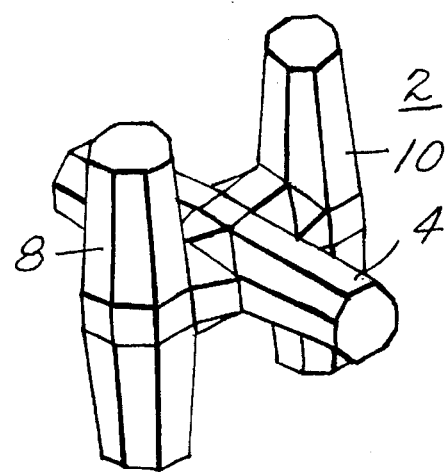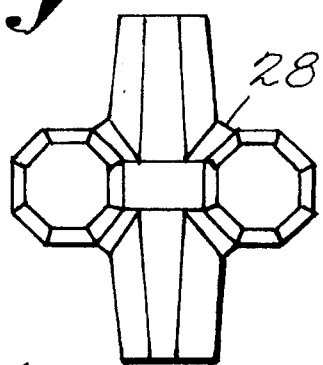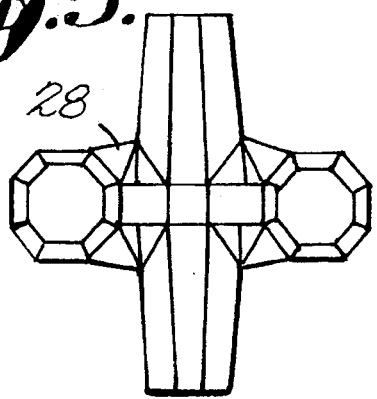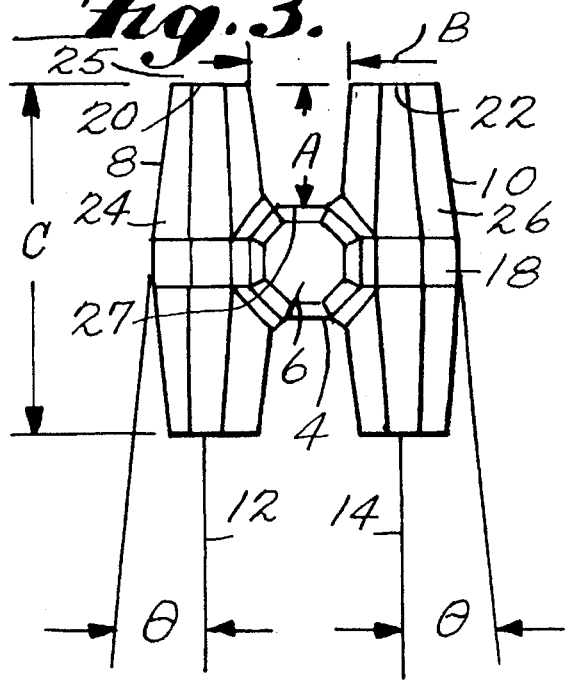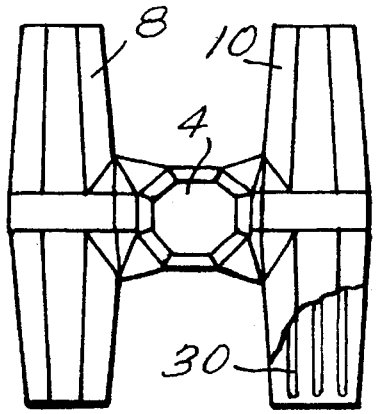

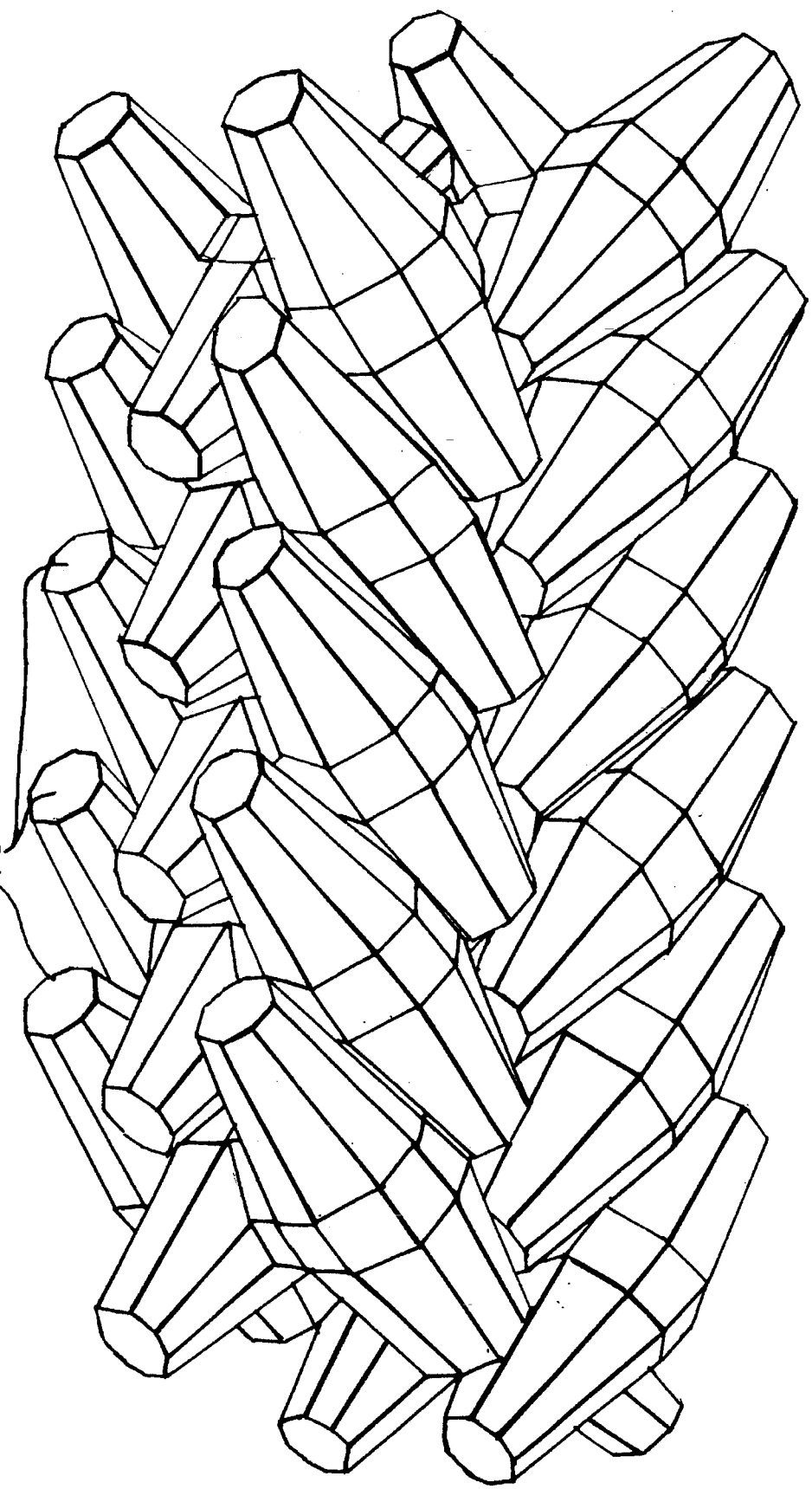

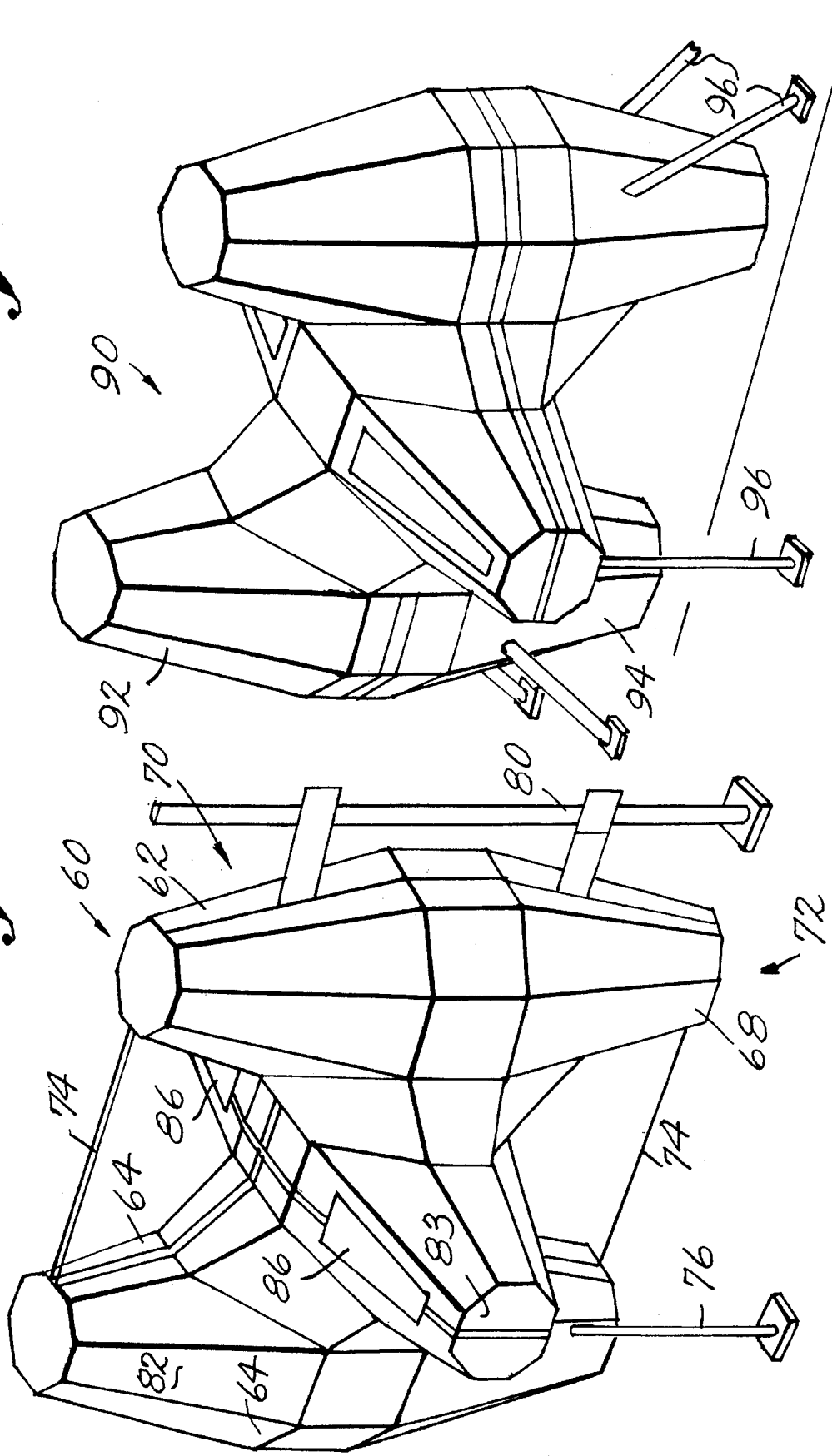

1

CONCRETE ARMOR UNIT TO PROTECT COASTAL AND HYDRAULIC STRUCTURES AND SHORELINES

CROSS REFERENCE TO RELATED APPLICATIONS

This application is a continuation-in-part of U.S. patent application Ser. No. 08/128,426, filed Sep. 30, 1993, now U.S. Pat. No. 5,441,362.

BACKGROUND OF THE INVENTION

The present invention relates to a concrete armor unit for protecting coastal and hydraulic structures and shorelines. In particular, the invention relates to randomly placed modules of a multiple slender-legged shape, to provide a stable interlocking assembly which resists the action of waves and water currents without exceeding the structural capacity of any single component of the assembly. In general, the modules are supported by an underlying layer of stone and are held in place by gravity and by the interlocking forces between adjacent modules.

BRIEF DESCRIPTION OF THE PRIOR ART

Interlocking concrete armor units or erosion prevention modules are well-known in the patented prior art as evidenced by the Kaneko et al. U.S. Pat. No. No. 3,614,866 and Chevallier U.S. Pat. No. 4,347,017.

The Kaneko et al. patent discloses a polypod block comprised of at least three integral pillar-shaped parts joined in an alternately crossed relationship. Hence, the block has at least six appendages which interlock with other blocks so that a large number of blocks can be arranged to form tightly assembled combinations. A primary drawback of the Kaneko et al. design is that the pillar-shaped members are joined together with a minimum amount of shared surface area. This provides tremendous stress concentrations at these areas. Owing to these excessive stress concentrations, the blocks possess a higher probability for breaking, potentially leading to a massive failure of an entire arrangement or assembly of blocks. Another drawback of the Kaneko et al. block is that the appendages do not stay together in an assembled fashion. This is due to the fact that the pillar-shaped members have a square cross-section which provides a limited area of frictional engagement with neighboring blocks. Yet another drawback derives from the regular arrangement of modules, whereby catastrophic failure of the entire protective structure can result from the failure of a relatively few armor blocks. Also, the regularly placed blocks produce an armor layer with very low porosity, providing little wave energy dissipation and therefore little contribution to reduction in wave energy for the protected area in the lee of the structure.

The Chevallier patent discloses a barrier block for protecting riverside structures and shorelines. The block comprises a cubic central core having top and bottom surfaces provided with anvil-shaped legs and opposed front and rear legs in the form of four-sided truncated pyramids. A major drawback of the hydraulic stability characteristics of the Chevallier block is that the anvil-shaped legs are not slender and thus produce minimal unit-to-unit wedging which reduces interlocking stability. The blocks rely primarily on gravity forces from overlying units to enhance individual block stability and must therefore be placed on steep slopes to assure stability. However, steep-sloped structures have a tendency to fail catastrophically and have proven to have a high probability of failure and risk when used. Placed on slope, the Chevallier unit exhibits the characteristics of a low-porosity armor layer, which provides less reduction in wave energy than found in an armor layer composed of more slender armor units. Further, the Chevallier blocks require exact placement in order to develop enhanced hydraulic stability.

Practical difficulties result in the manufacture, storage and transport of armor units. For example, some armor units have shapes which are not easily cast or formed. Some armor units do not allow for nested placement in yard areas or in shipping barges, and consequently are difficult to store and ship efficiently. Also, some structures are not repairable by simple addition of replacement armor units, but must be partially disassembled.

There is thus a need for a durable interlocking module capable of random placement resulting in a structure which has strong individual modules and which structure is stable. The module shape should have slender appendages to provide improved stability and wave energy dissipation over existing module shapes yet be strong enough to prevent failure of any single armor unit. There is a need for a module which may be used to repair existing slopes. There is also a need for a module which may be manufactured at lower cost, and which further may be stored and shipped at reduced cost.

SUMMARY OF THE INVENTION

The present invention overcomes these and other drawbacks of the prior devices by providing an armor unit or erosion prevention module which is uniquely configured to produce a high degree of interlocking and which provides stability regardless of the steepness of the structure's slope. The module has slender appendages which provide both significantly improved hydraulic stability and wave energy dissipation over prior art systems. Internal stress levels are minimized by shortening the appendages by filleting all of the internal member intersections.

The present invention provides an armor unit or erosion prevention module as the fundamental component for protecting ocean, coastal, river, lake and reservoir banks, and other structure armor layers from the damaging hydrodynamic forces of waves and water currents. In one embodiment, the module includes a central elongate concrete member and two outer elongate concrete members, all of which have generally uniformly tapered polygonal cross-sections. The two outer members are connected with the central member on opposite sides thereof. The outer members have central axes extending from the longitudinal axis of the central member. The elongate members are configured such that their cross-sectional area decreases from an intermediate portion toward opposite ends thereof to promote a high degree of wedging.

In a particular embodiment, the elongated concrete members have octagonal cross-sections and the longitudinal axes of the outer members are normal to the longitudinal axis of the central member.

In various embodiments, the modules have geometric characteristics including a separation aspect ratio, defined as the ratio of the separation distance between inner surfaces of the outer members to the overall length of the outer members in a range of about 0.45 and about 0.55; a depth aspect ratio, defined as the outer modular end length to the overall outer end length in a range of about 0.25 and about 0.35; and a taper in a range of about 10° and about 20°.

According to a further embodiment of the invention, the elongate members are connected at central intermediate portions. The connections include chamfered surfaces, whereby stress between the members is reduced.

Another embodiment of the invention features internal reinforcing bars within the elongate members.

BRIEF DESCRIPTION OF THE DRAWINGS

Other objects and advantages of the invention will become apparent from a study of the following specification when viewed in the light of the accompanying drawing, in which:

FIG. 1 is a perspective view of one embodiment of an armor unit according to the invention;

FIG. 2 is a top plan view of the armor unit of FIG. 1;

FIG. 3 is a front plan view of the armor unit of FIG. 1;

FIG. 4 is a perspective view of another embodiment of an armor unit;

FIG. 5 is a top plan view of the armor unit of FIG. 4;

FIG. 6 is a front plan view of the armor unit of FIG. 4 partially cut away to illustrate internal reinforcing bars;

FIG. 10 is an illustration showing the packing density of armor units according to the present invention; and FIGS. 11A and 11B are fragmentary perspective illustrations of clam shell forms for concrete casting armor units in accordance with the present invention.

DESCRIPTION OF THE INVENTION

Figure 7A:
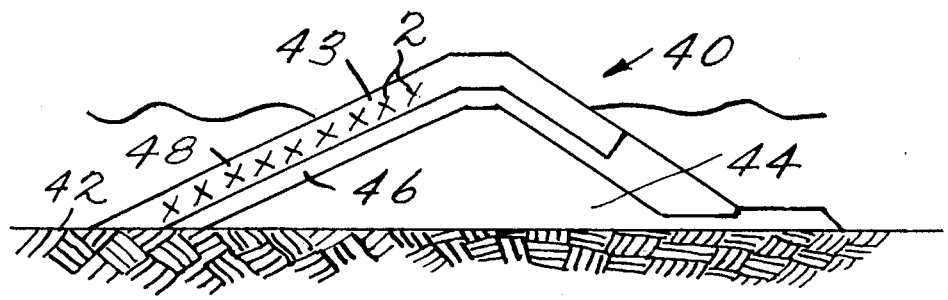
FIGS. 7A and 7B are respective side sectional elevations of a breakwater structure and the revetment structure.

Referring first to FIGS. 1–3, the armor unit or erosion prevention module 2 of the present invention comprises a central elongate member 4 having a longitudinal axis 6 and two outer elongate members 8 and 10 having longitudinal axes 12 and 14 respectively. The outer elongate members 8 and 10 are connected with the central elongate member 4 on opposite sides thereof, in the exemplary embodiment, the longitudinal axes 12 and 14 of the outer elongate members 8 and 10 extend parallel to each other and normal to the longitudinal axis of the central member 4. Preferably, the elongate members are connected at their central portions.

The three elongate members are substantially identical in shape and dimensions, and, in the preferred embodiment, have an octagonal cross-section.

As shown in FIG. 3, each of the elongate members is configured such that the cross-sectional area decreases from an intermediate portion 18 toward the opposite ends 20 and 22 thereof. The decreasing cross-sectional area is generally uniform, as shown. More particularly, the shape of each elongate member comprises an intermediate portion 18 having the bases of two frustum-shaped fluke sections 24 and 26 secured at opposite ends thereof. The armor units thus have an H shape when viewed from the end (e.g., FIG. 3). It should be understood that the armor units 2 may have various coplanar central axes 12 and 14. For example, the units may resemble an X in elevation. The central axes may also be curves derived from various conic sections, e.g., hyperbolic.

Figure 9A:
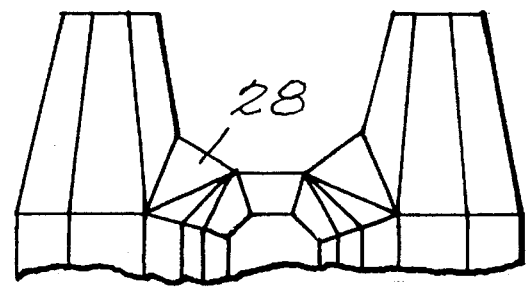
FIGS. 9A and 9B are fragmentary side elevations illustrating a chamfered and filleted transition between the members respectively.
Figure 9B:
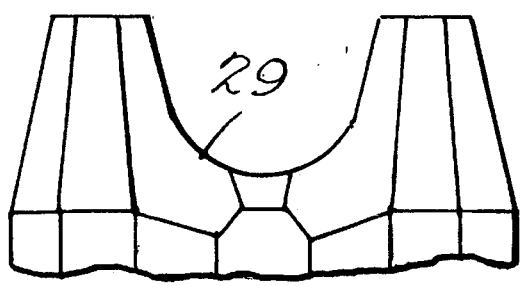
Figure 9C:
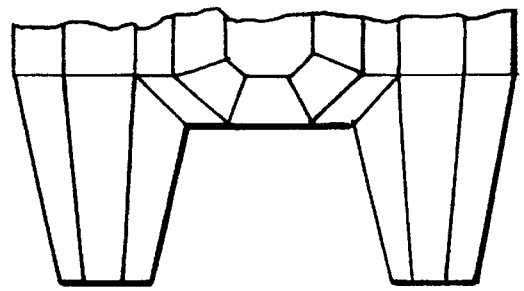
FIG. 9C is an illustration of an unchamfered and unfilleted transition.

The connections between the central elongate member 4 and the outer elongate members 8 and 10 comprise chamfered surfaces 28 which reduce stress at the area of concentration. As shown in FIGS. 9A and 9B in the present invention, chamfers or fillets 28 and 29 are placed at high-angle intersections of the members to reduce stress concentrations in these areas, thus further improving the structural integrity of the unit. An unchamfered or filleted device is shown in FIG. 9C for comparison. The internal high-angle intersections have been shown to have the highest stresses in armor units of many shapes. Angular chamfers 28 would typically be easier to construct than circular fillets 29 but provide slightly less stress reduction. Tests have shown that chamfered sections, as specified for this module, provide 30% to 40% reduction in internal stresses over non-modified angled intersections while filleted sections provide 40% to 50% reduction in internal stresses over non-modified sections.

FIGS. 4–6 illustrate another more slender embodiment of the invention comprising elongate members having reduced cross-sectional area with extended connections, or spacing, between the outer members and the central member.

Either embodiment of the present invention is adapted to be arranged with a multiplicity of other such modules to form a cohesive, interlocking armor array or barrier which resists hydrodynamic forces tending to erode navigation structures and shorelines and other structures. Ideally, stability is maintained in such an array or barrier even when individual modules are removed from the bottom by hydraulic action. The octagonal elongate members maintain a high degree of wedging with one another while spacing between the members and the chamfered surfaces offer excellent stability within an array. Assemblies formed from slender armor units (FIGS. 4–6) tend to have greater stability than assemblies of stout modules (FIGS. 1–3) due to better interlocking between elongate members.

Modules having varying aspect ratios (i.e., a degree of slenderness or stoutness) may be provided so that modules can accommodate a wider range of gradation of underlayer stone and optimization of stress versus layer stability. For example, aspect ratios may be defined in various ways to describe the geometrical dimensions of the erosion protection module according to the invention. FIG. 3 illustrates the exemplary dimensions referred to herein. The depth aspect ratio $R_D$ may be defined as the ratio of the fluke end length (A), measured from the fluke end 25 to the surface 27 of the central member 4, to the fluke length (C). The separation aspect ratio $R_s$ is the ratio of the widest separation distance (B) between the inner surfaces 29 of two adjacent fluke ends 25 to the fluke length (C) defined above. These two aspect ratios may be adjusted to provide the maximum wedging and interlocking among units without introducing failure-level stresses, when the units are placed randomly.

In accordance with the invention, the separation aspect ratio: $R_s=B/C$ is generally in a range of about 0.45 and 0.55 and preferably about 0.47 and 0.48. Likewise, the depth aspect ratio: $R_d=A/C$ is generally in a range of about 0.35 and about 0.25 and preferably about 0.32 and about 0.27 and more preferably about 0.32 and 0.30.

Each fluke 24 and 26 has a taper angle θ measured as the angle between the longitudinal fluke axis 12 and 14 and the respective exterior surface 31 of the corresponding fluke 24 and 26. θ varies generally in a range of about 10° and about 20°. The table below shows two exemplary embodiments.

TABLE

| Example I | Example II |
|---|---|
| θ = 12° | θ = 20° |
| $R_s$ = 0.47 | $R_s$ = 0.48 |
| $R_d$ = 0.32 | $R_d$ = 0.27 |

Although the cross-sectional shape of the members of the present invention can be various polygonal and conical shapes, the octagonal shape is thought to be the most efficient. Round or conical sections tend to produce less resistance to rocking. Fewer-sided sections, for instance square or hexagonal, have higher angled edges producing higher stresses at the edges resulting in increased spalling of the outer concrete surfaces. Sections with more than eight sides are more expensive to construct as form assembly and construction requires more labor to cut fabricate and attach the increased number of form panels.

Shape improvement is also provided by sufficiently tapering the member ends to permit wedging and interlocking of the member ends when individual units are placed in a random orientation within a single-layer matrix. Also, full symmetry of the member ends promotes wedging between units when units are placed randomly. This enhances the stability.

Although preferably made from concrete, the entire module may be formed of any suitable material or combination of materials such as composites, stone, and/or metal. The embodiments of the invention illustrated are strong enough not to require structural strengthening, although such strengthening may be included, if desired. As shown in FIG. 6, the module may include internal reinforcing bars 30, such as metal or fiberglass rebar, in the elongate members. The bars extend generally parallel to the axes 12 and 14 of the elongate members. If desired, a latticework of internal reinforcing bars may be provided. The bars can be either deformed rods or post-tensioned rods for extreme conditions.

FIG. 7A illustrates the cross-section of a jetty or breakwater 40 formed on the sea bottom 42 subjected to waves and currents 43. The breakwater 40 comprises a mound or core section 44 which has an upper surface covered with a so called underlayer 46 of stone or blocks or both, and a single over-lying layer of armor 48 comprising randomly placed armor units 2.

Figure 7B:
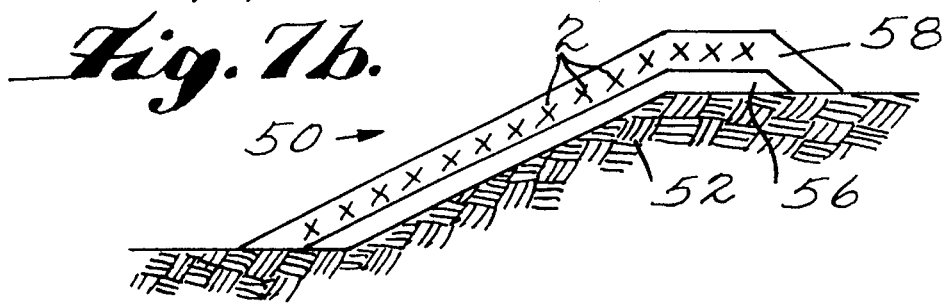

FIG. 7B illustrates a revetment 50 in cross-section of an earth mound, an under layer 56 and a single armor layer 58 of randomly placed modular armoring units 2.

The random orientation of armor units 2 in high-wave height applications is important because the precision necessary for reliable uniform placement is unattainable in deep, low-visibility coastal waters, and also in shallow but wavy environments. Also, the precision is generally not economically feasible on irregular underlayers composed of the randomly placed irregularly shaped stone, which are almost always used. In addition, most uniformly placed armor layers have little resistance to forces caused by back pressures which are due to excess pore pressure build-up in the structure underlayers and core. Uniformly placed armor layers composed of stout armor units often provide little wave energy dissipation and therefore offer less protection for objects in the lee of the structure than armor layers composed of slender units. Uniformly placed units are also seldom capable of self healing whereas randomly placed units can heal themselves, as discussed below.

The single-layer matrix 48, 58 recommended for the present invention is far more economical than the two layer systems used with most other units. For the single layer, the volume of concrete and the number of units required are approximately half that of a conventional two-layer matrix.

The combination of symmetrically and sufficiently tapered members, symmetrical unit geometry, and specified aspect ratios provides a structure formed of armoring units 2 that exhibits maximized stability and wave energy dissipation in the armor layer yet has minimal integral stress levels. For example, two dimension physical model hydraulic stability tests have shown that the present invention is a significant improvement over prior art systems.

Two dimensional physical model tests of prior art systems have been conducted by others in accordance with commonly accepted practice in coastal engineering research. These results are published in the AIPCN-PIANC Bulletin 1994-No. 82-2 82-16. Comparative data show that the armoring units of the invention are stable, with no measurable damage, when subjected to water waves over twice the height of those waves producing instability in most other armor unit shapes.

The coefficient $K_D$ is a dimensionless number that is most commonly used as a design criterion for designing wave resistant structures. $K_D$ is used in the Hudson Equation to determine the stable weight of an armor unit for breakwaters, jetties, and revetments, given the design wave height, unit weight of the material the armor is made of, specific gravity of the material the armor is made of, and the slope of the structure.

$$W = \frac{\gamma H^3}{K_D(S_r - 1)^3 \cot\alpha}$$

Where:

W is the mean weight of armor unit having a value which usually ranges from 2 tons to 40 tons;

γ is the unit weight density of armor unit material having a value of about 143 pounds per cubic feet for concrete;

H is the design wave height having a value which ranges from about 5 feet to 35 feet;

$K_D$ is the stability coefficient, i.e., an empirical parameter used in the Hudson Equation and is typically around 10 for most prior art armor shapes;

$S_r$ is the specific gravity of armor unit material which is about 2.25 for concrete in seawater; and cotα is the slope of structure, i.e, cotα has a value of 2 for a 1V:2H structure.

Figure 8:
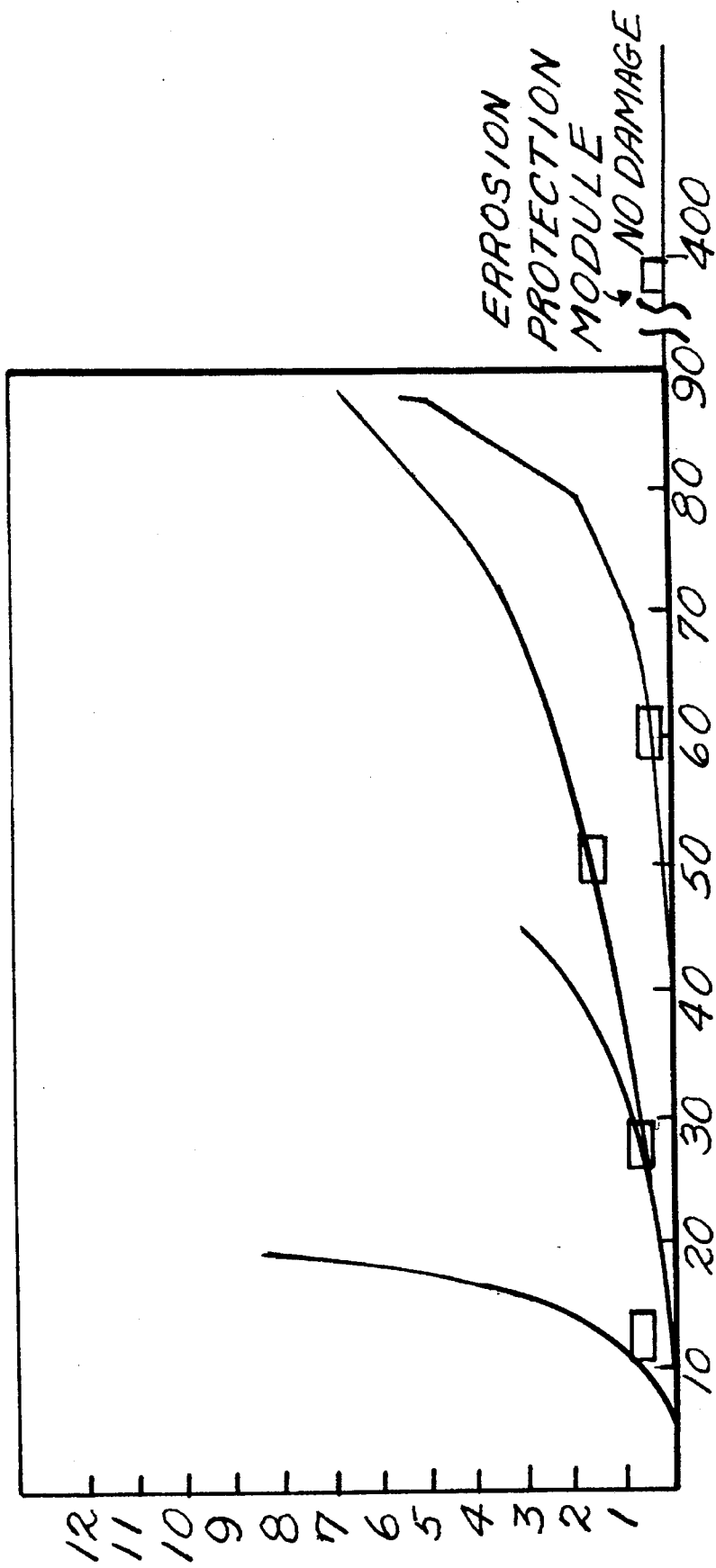
FIG. 8 is a graphic representation of percent damage versus stability coefficient for a variety of known structures, established during two dimensional physical modeling testing, compared with corresponding data for the structure according to the present invention.

FIG. 8 is a comparative plot of the two dimensional data illustrating the relationship between the stability coefficient $K_D$ and percent damage to the armor layer of a structure's trunk section, using a variety of commonly known armoring units, represented by curves A, B, C and D. It can be seen from the illustration that significant damage occurs when the stability coefficient is less than 80, indeed some models allow significant damage when the stability coefficient is as low as 10.

In comparison, tests conducted on a single-layer structure truck section, using the armoring unit of the present invention indicate that the probability of damage is near zero for stability coefficients as high as 400 (see curve E). An increase in the stability coefficient by a factor of 2 decreases the stone weight by a factor of 2. Thus, it is clear that significant savings may be achieved by increasing the stability coefficient, as illustrated herein.

It should be understood that two dimensional (2D) testing is a well recognized and preferred method for characterizing these structures. Three dimensional testing is more complex and generally results in a lower stability coefficient, which more accurately characterizes the structure. However, for purposes of comparison the 2D method is believed to be appropriate.

Another way to characterize the invention is that the shape of the module should be capable of exhibiting zero measurable damage when tested in the laboratory using generally accepted coastal physical modeling practice and subjected to wave heights of a magnitude corresponding to Hudson equation stability coefficients of at least 70. The present invention has been physically modeled up to a Hudson equation stability coefficient of 400 without showing damage.

Physical model stability tests of the present invention have also shown the armor layer to be self healing for minor armor unit movements, which always occur during settlement of structures. The armor units move and nest together during settlement so as to achieve maximum interlocking and wedging, minimizing the distance between unit centroids. This occurs even if large movements of individual units are induced, such as dislodging or extraction of a unit from the slope, because the interlocking members will act to restrain the remaining units while the area renests. Other shapes that require uniformly placed slopes are typically not capable of exhibiting this self healing characteristic. This is because the stability of uniformly placed slopes is maximized by the unit-to-unit friction rather than the interlocking of member ends. Therefore, if one unit is dislodged there will be greatly reduced inter-unit frictional forces acting to restrain the remaining units.

The following is a comparison of various 2D design criteria which may be used to evaluate the stability and effectiveness of an armor unit of the invention with known systems.

For example, an armor unit sold under the Trademark ACCROPODE (corresponding to the armor unit shown in the Chevallier patent) having a volume 5.9, and a slope factor of 0.92 would cost approximately 27% more than the invention having a volume of 4.28 and a slope factor of 1. A Dolos layer, with a slope factor of 1.24, would cost 72% more than the invention. A block layer would be three times more expensive than the invention.

Dolos units are prone to breakage because of the slender central sections. The present invention has no slender central sections and is therefore not prone to such breakage. The shape of the armor unit 2 of the present invention allows the unit to be used in the repair of so-called Dolos slopes because of the octagonal member shape, similar tapers, and the similar aspect ratios. The separation and depth aspect ratios are both dimensioned such that the present invention interlocks well with the Dolos shape. The present invention can thus be intermixed with Dolos units or used to repair an entire section of a Dolos slope. The repair with modules according to the invention requires fewer new units than are required to replace the entire slope with a different type of unit. Moreover, a hybrid slope employing Dolos units and armor units of the invention provides improved stability over an all-Dolos slope.

The individual armor units of the present invention are also conveniently stackable, reducing the required casting yard and shipping space. One stacking scheme is shown in FIG. 10. Stacking is important to economic viability when armor units are to be barged long distances to remote sites or to sites where limited construction materials are available. Because of their unique configuration, the armor units of the invention can be efficiently stored in a casting yard. For example, the units can be tightly packed or stacked in multiple layers in a herring-bone configuration, as shown. Note the remarkably small center to center spacing of the invention. The packing density in terms of centroid to centroid spacing is minimal with the present invention and is typically about 100% of the largest diameter of the outer member for stacked units, and is in a range of about 120 and 140% for randomly placed units, which is less than known systems.

TABLE

| | Invention CORE-LOC | Stone | Block | DOLOS | ACCROPODE | Tetrapod | Uniform Tribar | Random Tribar | HARO |
|---|---|---|---|---|---|---|---|---|---|
| Slope, cot(a) | 1.5 | 2 | 1.5 | 2 | 1.33 | 1.5 | 2 | 2 | 1.5 |
| $K_D$ | 16 | 2 | 6 | 15.8 | 12 | 7 | 12 | 9 | 11 |
| W (tons) | 34.77 | 208.63 | 92.72 | 26.41 | 52.29 | 79.48 | 34.77 | 46.36 | 50.58 |
| Unit Volume (cf) | 486.32 | 2917.92 | 1296.85 | 393.36 | 731.31 | 1111.59 | 486.32 | 648.43 | 707.37 |
| No. of Units per sq foot | 0.0088 | 0.0062 | 0.0100 | 0.0161 | 0.0081 | 0.0097 | 0.0097 | 0.0125 | 0.0133 |
| Volume concrete (cf/sf) | 4.28 | 18.01 | 12.96 | 5.94 | 5.90 | 10.77 | 4.71 | 8.12 | 9.41 |
| Slope factor | 1.00 | 1.24 | 1.00 | 1.24 | 0.92 | 1.00 | 1.24 | 1.24 | 1.00 |
| Economics, Volume-Based | 1.00 | 5.22 | 3.03 | 1.72 | 1.27 | 2.52 | 1.37 | 2.35 | 2.20 |

The Economic comparison of armor units from the Table is based on a design wave height of H=28 feet and a unit weight density of $\gamma$=143 pounds per cubic foot. The Economics, Volume-based row is the ratio of volume $V_m$ of the armor units of the invention to volume $v_0$ of other armor layer units for a given slope factor which must be considered:

i.e., Economics = $V_o/V_f$–Slope factor

FIG. 11A is a fragmentary perspective view of a four piece clam shell form 60 for cast an armor unit 2 according to the present invention. The form 60 comprises four symmetrical quadrants 62, 64, 66 and 68 formed in hinged elongated halves 70 and 72 corresponding to the longitudinal portions and a split central section 73 corresponding to the central elongate member. Cross braces 74 secure the elongate sections 70 and 72 in side-by-side relationship. Supports 76 support the ends of the central elongate section 73. Hinges 80 and 82 hold the corresponding quadrants 62, 64, 66, 68 together respectively, as shown. The end portion 83 of the central portion is closed for containing concrete and the upper and lower ends of the lateral members are open for receiving concrete. It should be understood that the form 60 sits on the ground surface and contains the concrete therein. Port members 86 allow the release of entrained air and excess water. Alternatively, the arrangement of FIG. 11A may be modified as shown in FIG. 11B so that the entire unit 90 may be formed of respective upper and lower halves 92 and 94 secured together. The lower half 94 is supported by braces 96.

The forms may be constructed of any material but are commonly made of metal, wood, fiberglass or plastic, although large armor unit forms are most commonly made of welded sheet steel. The form must be efficiently built to minimize materials but maximize rigidity, even with repeated use.

While in accordance with the provisions of the patent statute and the preferred forms and embodiments have been illustrated and described, it will be apparent to those of ordinary skill in the art that various changes and modifications may be made without deviating from the inventive concepts set forth above.

What is claimed is:

1. An armor unit for protecting harbor and navigation channels, and coastal, river, lake and reservoir banks and shorelines and other structures from the damaging hydrodynamic forces of waves and water currents, comprising:

a central elongate member having a longitudinal axis; and first and second outer elongate members connected with said central elongate member on opposite sides thereof, said first and second outer elongate members having parallel longitudinal axes extending normal to said longitudinal axis of said central elongate member, said elongate members each having an octagonal cross-section, the cross-sectional area of each member decreasing from an intermediate portion toward the opposite ends thereof, whereby when a plurality of structures are interlocked to define a protective array, a high degree of wedging is afforded between said octagonal members and residual stability is provided in the array.

2. An armor unit according to claim 1, wherein each of said elongate members is configured as two frustums joined at their bases by an intermediate portion.

3. An armor unit according to claim 1, wherein said central elongate member is configured as two frustums joined at their bases by an intermediate portion.

4. An armor unit according to claim 1, wherein said central elongate member and said outer elongate members are connected via chamfered surfaces, whereby stress between said members is reduced.

5. An armor unit according to claim 4, wherein said chamfered surfaces between said elongate members are extended to connect said elongate members to said central elongate member, whereby greater structural stability within an array of said structures is achieved.

6. An armor unit according to claim 4, wherein said elongate members are equal in length.

7. An armor unit according to claim 6, wherein said elongate members are formed of concrete.

8. An armor unit according to claim 1, wherein said elongate members contain internal reinforcements.

9. An armor unit according to claim 8, wherein said reinforcements comprise metal rods.

10. An armor unit for protecting coastal, river, lake and reservoir banks, shorelines and other structures from the damaging hydrodynamic forces of waves and water currents, comprising:

a central elongate member having a longitudinal axis; and first and second outer elongate members connected with said central elongate member on opposite sides thereof, said first and second outer elongate members having coplanar central axes extending normal to said longitudinal axis of said central elongate member, said elongate members each having a cross-sectional area of each member decreasing from an intermediate portion toward the opposite ends thereof, and wherein when a plurality of structures are interlocked to define a protective array, a high degree of wedging is afforded between said octagonal members and residual stability is provided in the array.

11. An armor unit according to claim 10 wherein the elongated members have a polygonal cross-section.

12. An armor unit according to claim 10, wherein each of said elongate members is configured as two frustums joined at their bases by an intermediate portion.

13. An armor unit according to claim 10 wherein the cross-sectional area of each member decreases uniformly from the intermediate portion towards the opposite ends thereof.

14. An armor unit according to claim 13 wherein the uniform decrease in cross-sectional area is linear.

15. An armor unit according to claim 10 wherein said elongate members are identical in shape.

16. An armor unit according to claim 10 wherein the cross-section of each member is symmetrical relative to other members.

17. An armor unit according to claim 10 having a general shape symmetric about perpendicular surfaces parallel to at least one member axis.

18. An armor unit according to claim 10 wherein the outer members have at least one of an H, X and hyperboloid profile.

19. An armor unit according to claim 10, wherein said central elongate member and said outer elongate members are connected via chamfered surfaces, whereby stress between said members is reduced.

20. An armor unit according to claim 19, wherein said chamfered surfaces between said elongate members are extended to connect said elongate members to said central elongate member, whereby greater structural stability within an array of said structures is achieved.

21. An armor unit according to claim 19, wherein said elongate members are equal in length.

22. An armor unit according to claim 10, wherein said module has a depth aspect ratio ($R_D$) defined as the ratio of the length of an outer member to the surface of the central member (A) to the length of the outer member (C), wherein A/C is in a range of about 0.35 and about 0.25.

23. An armor unit according to claim 22, wherein $R_D$ is in a range of about 0.32 and about 0.27.

24. An armor unit according to claim 22, wherein $R_D$ is in a range of about 0.32 and about 0.30.

25. An armor unit according to claim 10, wherein the module has a separation aspect ratio ($R_s$) defined as the ratio of the widest separation distance (B) between inner surfaces of the outer members and the length of the outer member (C), wherein B/C is in a range of about 0.45 and about 0.55.

26. An armor unit according to claim 25, wherein $R_s$ is in a range of about 0.47 and about 0.48.

27. An armor unit according to claim 10 wherein each outer member has a taper measured as the angle $\theta$ between the central axes of the outer member and the outer surface and $\theta$ is in a range of about 10° and about 20°.

28. An armor unit according to claim 27 wherein θ is in a range of about 12° and about 20°.

29. An armor unit according to claim 10 wherein individual modules are randomly placed such that the minimum spacing of adjacent members is within about 140% of the largest diameter of the outer member.

30. An armor unit according to claim 29 wherein the minimum spacing of adjacent members is in a range of about 120% and about 140% of the largest diameter of the outer member.

31. An armor unit according to claim 10 wherein the individual modules are regularly stackable such that the minimum spacing of adjacent members is within about 100% of the largest diameter of the outer member.

32. An armor unit according to claim 10, having a two dimensional stability coefficient of at least about 70.

33. An armor unit according to claim 10, having a two dimensional stability coefficient of about 400.

34. An armor unit according to claim 10 wherein the module has a shape capable of exhibiting zero damage when tested in the laboratory using generally accepted coastal physical modeling practice and subjected to wave heights of a magnitude corresponding to Hudson equation two dimensional stability coefficients of at least 70.

35. An armor unit according to claim 10 wherein the module has a shape capable of exhibiting zero damage when tested in the laboratory using generally accepted coastal physical modeling practice and subjected to wave heights of a magnitude corresponding to Hudson equation two dimensional stability coefficients of at least 400.

36. A structure for protecting coastal, river, lake and reservoir banks, shorelines and other earthen and stone structures from the damaging hydrodynamic forces of waves and water currents, said structure being formed of at least one single layer of randomly placed armor units each comprising:

a central elongate member having a longitudinal axis; and first and second outer elongate members connected with said central elongate member on opposite sides thereof, said first and second outer elongate members having coplanar longitudinal axes extending from said longitudinal axis of said central elongate member, said elongate members each having a tapered regular cross-section, the cross-sectional area of each member decreasing from an intermediate portion toward the opposite ends thereof, said plurality of structures interlocking to define said protective layer having a high degree of wedging between members and a resulting two dimensional stability of at least 70.

37. An armor unit according to claim 36 wherein the earthen structure comprises a jetty or breakwater formed of a core of stone and an underlayer of stone or blocks.

38. An armor unit according to claim 36, wherein the earthen structure comprises a revetment formed of earth and a layer of stone or blocks.

39. A form for casting an armor unit for protecting coastal, river, lake and reservoir banks, shorelines and other earthen and stone structures from the damaging hydrodynamic forces of waves and water currents, comprising:

a hollow central elongate member having a longitudinal axis; and first and second outer hollow elongate members connected with said central elongate member on opposite sides thereof, said first and second outer elongate members having coplanar longitudinal axes extending from said longitudinal axis of said central elongate member, said elongate members each having a tapered regular cross-section, the cross-sectional area of each member decreasing from an intermediate portion toward the opposite ends thereof.

40. The form of claim 39 wherein the form is split along a first plane including axes of the outer members.

41. The form of claim 39 wherein the form is split along a plane perpendicular to the first plane and including the axis of the central member.

* * * * *